United States Patent [19]

Izume et al.

[11] Patent Number: 5,166,491
[45] Date of Patent: * Nov. 24, 1992

[54] MASTER COMPUTER CONTROLLED MODULAR WELDER, WELD CONTROL AND POWER UNIT APPARATUS AND METHOD

[75] Inventors: Takatomo Izume, Urawa, Japan; Michael Lalonde, Detroit, Mich.

[73] Assignee: Kabushiki Kaisha Toshiba, Kawasaki, Japan

[*] Notice: The portion of the term of this patent subsequent to Jan. 15, 2008 has been disclaimed.

[21] Appl. No.: 606,827

[22] Filed: Oct. 31, 1990

Related U.S. Application Data

[63] Continuation of Ser. No. 133,377, Dec. 15, 1987, Pat. No. 4,985,612.

[51] Int. Cl.$^5$ .................................. B23K 11/24
[52] U.S. Cl. ........................... 219/110; 219/116
[58] Field of Search ................ 219/108, 110, 116

[56] References Cited

U.S. PATENT DOCUMENTS

| | | | |
|---|---|---|---|
| 4,634,830 | 1/1987 | Furudate | 219/110 |
| 4,910,375 | 3/1990 | Izume | 219/110 |
| 4,985,612 | 1/1991 | Izume et al. | 219/110 |

FOREIGN PATENT DOCUMENTS

| | | | |
|---|---|---|---|
| 60-180683 | 9/1985 | Japan | 219/116 |
| 61-242773 | 10/1986 | Japan | 219/110 |

*Primary Examiner*—Clifford C. Shaw
*Attorney, Agent, or Firm*—Oblon, Spivak, McClelland, Maier & Neustadt

[57] ABSTRACT

A welder apparatus has many welder assemblies. Each of welder assemblies is formed of a weld control transformer (WCT) to which a welding gun is attached, and a weld control unit (WCU) integrally but detachably connected to the WCT. The feature of the detachable connection between the WCT and the WCU provides a compact size for each of WCT and WCU. This feature also permits a standardized connection dimension and standardized connection interface between the WCT and the WCU for all welder assemblies. These standardized connection dimension and interface allow an optional combination of any of WCT's and any of WCU's, and plural assemblies of this combination can be managed by a single host computer (or machine control interface MCI). Further, no connection cables are required between the WCT and the WCU for all welder assemblies.

5 Claims, 17 Drawing Sheets

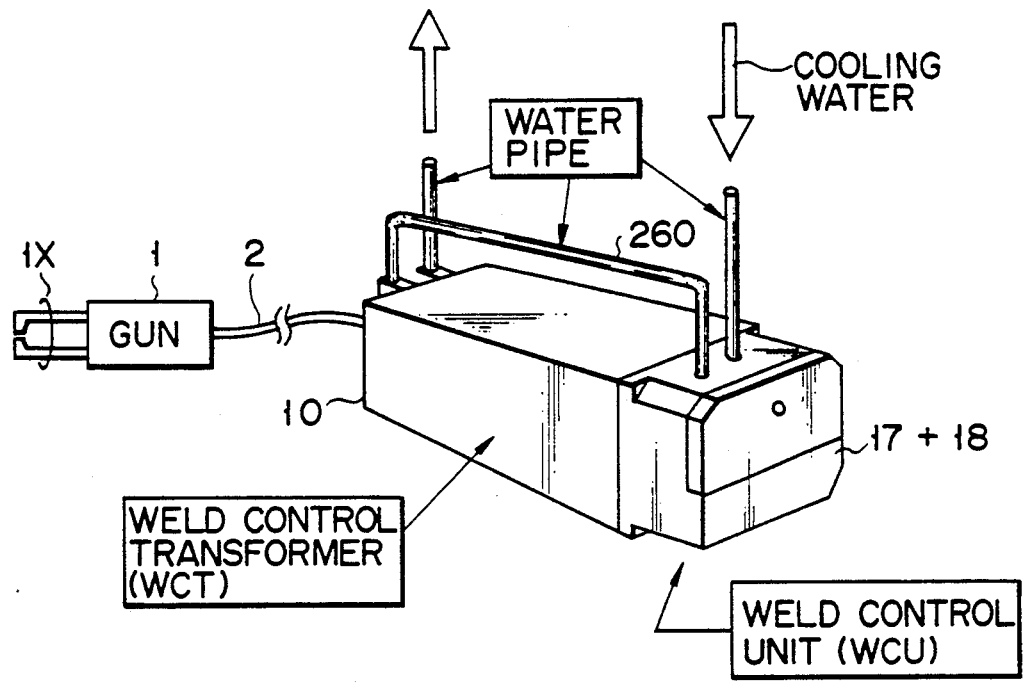
F I G. 1
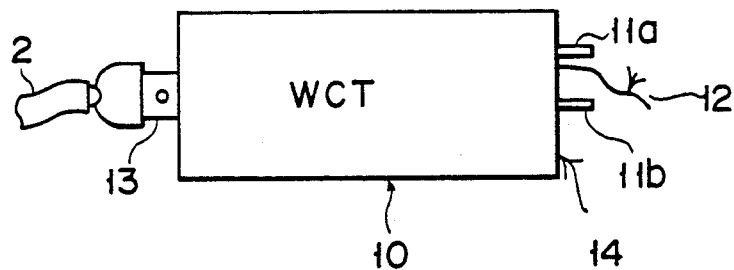
F I G. 2
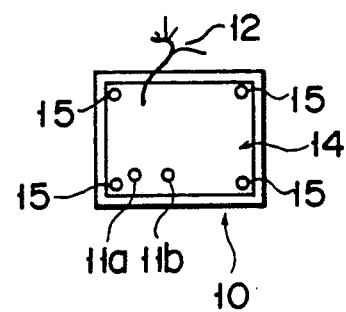
F I G. 3

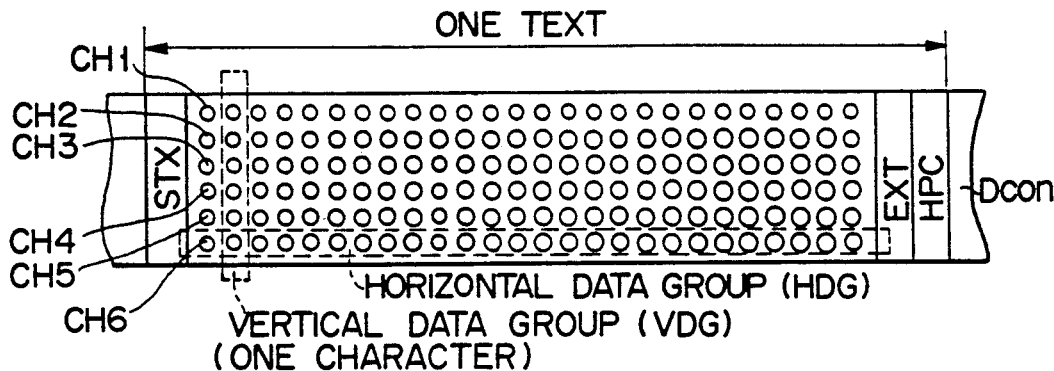
F I G. 18A
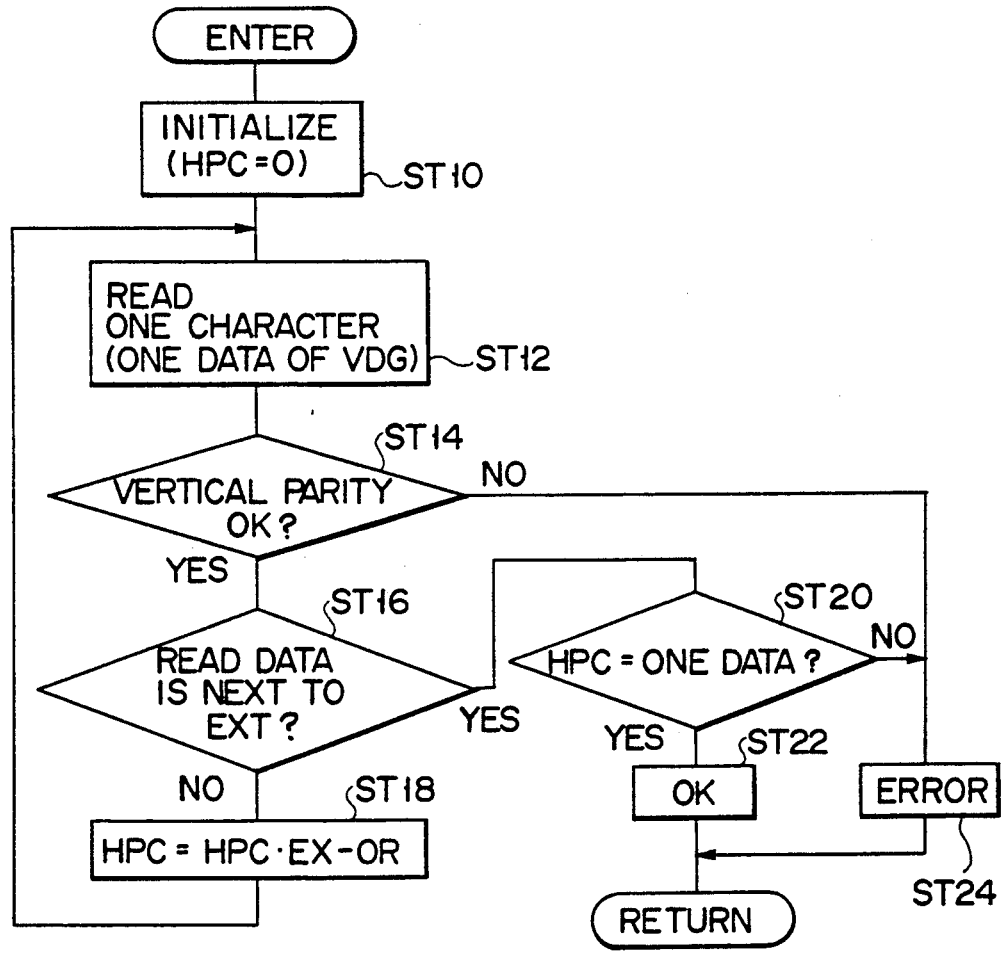
F I G. 18B

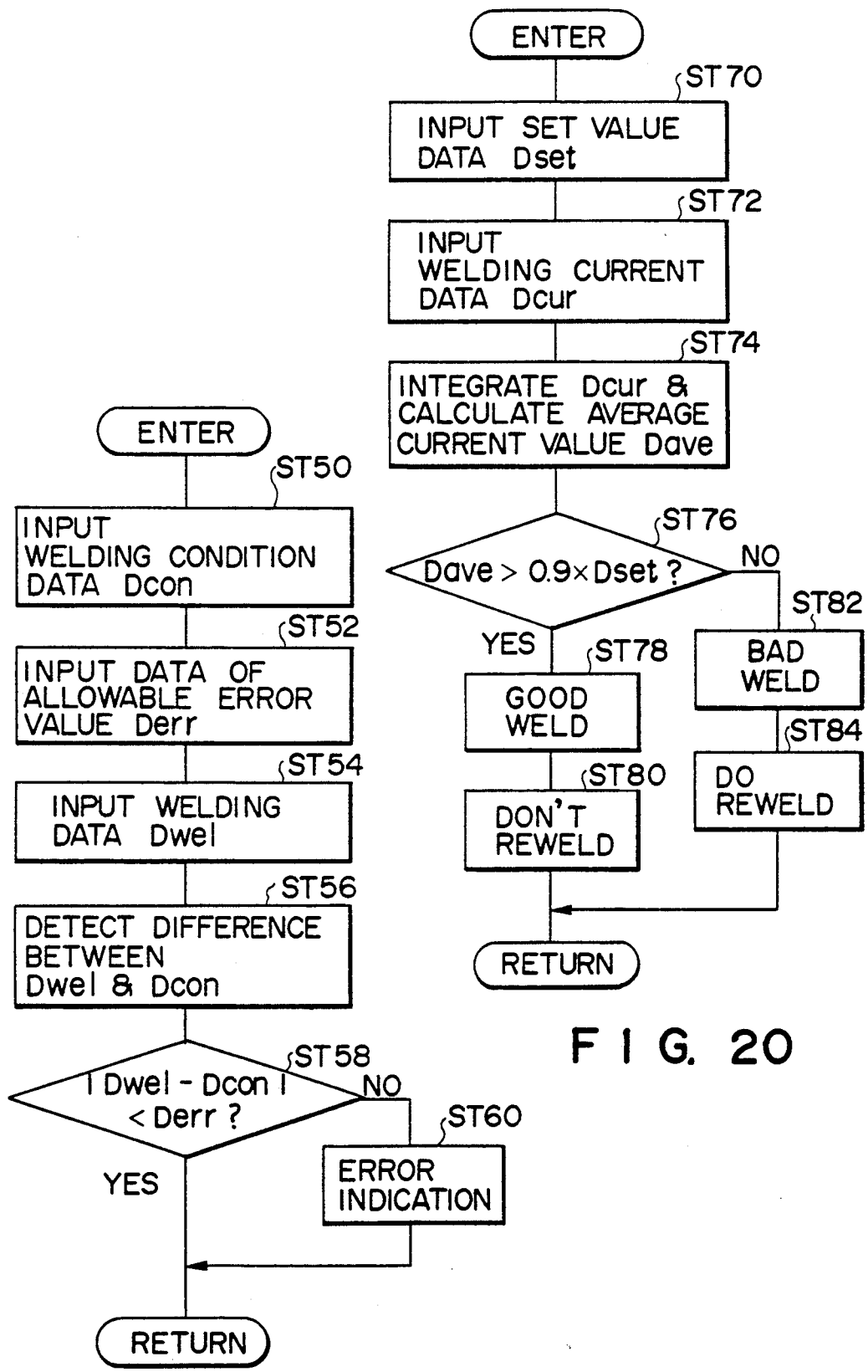

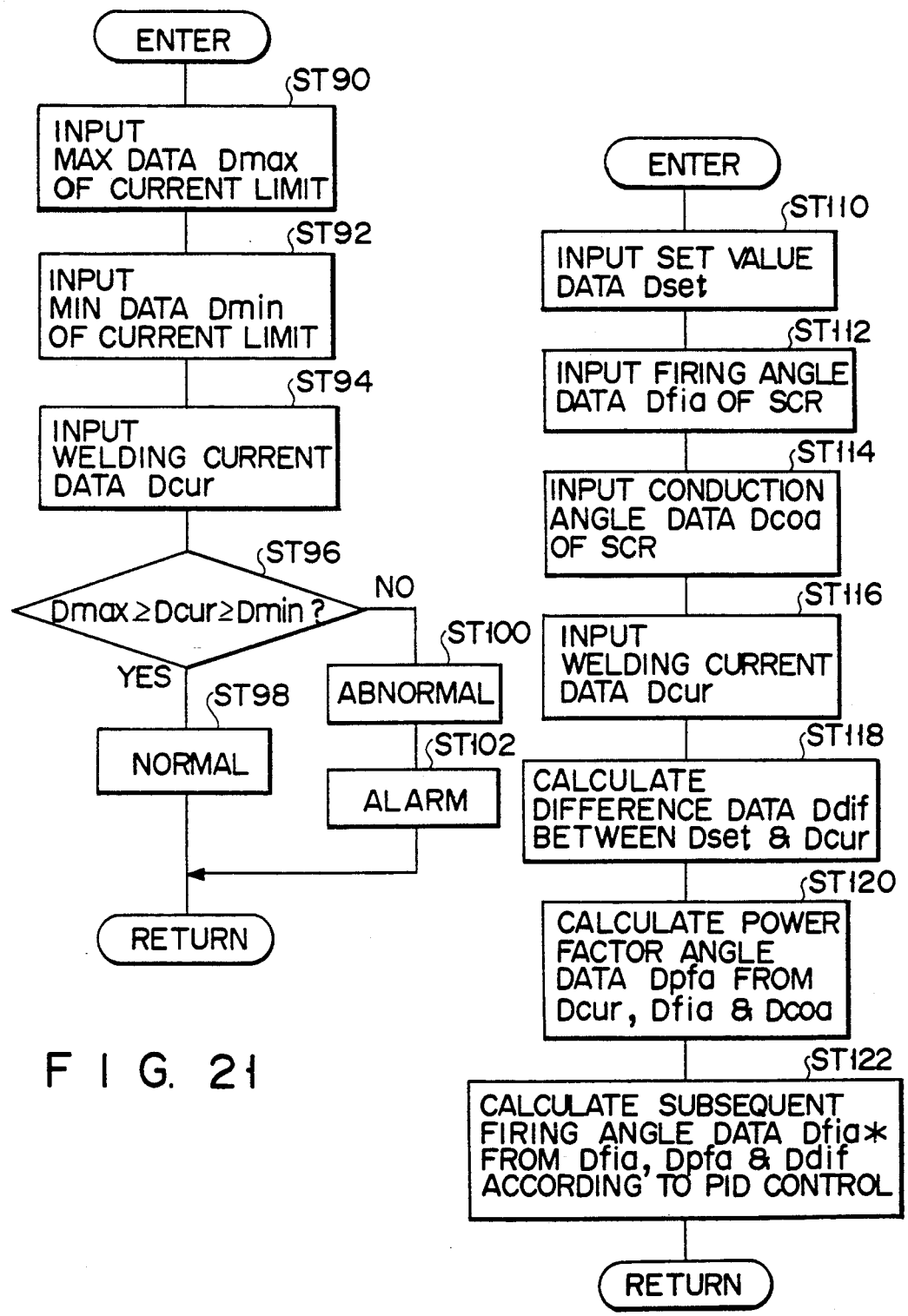

MASTER COMPUTER CONTROLLED MODULAR WELDER, WELD CONTROL AND POWER UNIT APPARATUS AND METHOD

This is a continuation of application Ser. No. 07/133,377, filed on Dec. 15, 1987 now U.S. Pat. No. 4,985,612.

BACKGROUND OF THE INVENTION

The present invention relates to a welder apparatus having a feature of a compact combination of a weld control transformer and weld control unit.

Typical welder apparatus are resistance welders or arc welders. Such welders are widely used in many manufacturing industries. In particular, those welders are indispensable in an automobile industry, for performing welding of thin steel plates of car bodies.

FIG. 11 shows a basic configuration of a conventional resistance welder which is formed of gun 1 having welding electrodes, weld transformer 2, and weld control unit 3. In recent years, there is a large demand for a compact resistance welder constituted by two components, one of which is an assembly of gun 1 and transformer 2, and the other of which is control unit 3.

In a resistance welder conventionally used in the automobile industry, gun 1, weld transformer 2, sequencer 4, and program unit 5 are installed near conveyer line C, as is shown in FIG. 12, while only weld control unit 3 is installed in a mezzanine separated from conveyer line C. For this reason, a physical distance between control unit 3 and conveyer line C often becomes several tens meters and, therefore, it is necessary to install long power cable 6 between unit 3 and transformer 2, long signal cable 7 between unit 3 and sequencer 4, and long signal cable 8 between unit 3 and unit 5.

In a recent automobile industry, multispots welding has been widely employed. In multispots welding, a car body, i.e., a workpiece to be welded, is fixed by a jig, and many spots of the workpiece are simultaneously welded by a gun having many welding electrodes, using an industrial robot.

In the above-mentioned conventional welder, the gun, weld transformer, weld control unit, sequencer, and program unit are arranged separately. Therefore, in order to achieve signal transmission among the above transformer and units, many long cables must be installed, posing problems of installation cost and installation space, etc.. Further, when multispots welding is performed, many components (the gun, transformer, sequencer, and program unit) must be arranged with their specific correlation. Then, modification of welding conditions, installation of each component, and/or maintenance thereof becomes a laborious work.

SUMMARY OF THE INVENTION

It is accordingly an object of the present invention to provide a welder apparatus being free of the prior art problems. To achieve the above object a welder apparatus of the invention has one or more resistance welder assemblies each of which is formed of a weld control transformer (WCT) to which a welding gun is attached, and a weld control unit (WCU) integrally but detachably connected to the WCT.

The feature of the detachable connection between the WCT and the WCU permits a compact size for each of WCT and WCU. This feature also permits a standardized connection dimension and standardized connection interface between the WCT and the WCU for all resistance welder assemblies. These standardized connection dimension and interface allow an optimal combination of any of WCT's and any of WCU's, and plural assemblies of this combination can be managed by a single host computer (or machine control interface MCI). Further, no connection cables are required between the WCT and the WCU for all resistance welder assemblies.

BRIEF DESCRIPTION OF THE DRAWINGS

FIG. 1 is a perspective view of a resistance welder assembly formed of weld control transformer WCT and weld control unit WCU, which is an embodiment of the present invention;

FIG. 2 is a side view of WCT shown in FIG. 1;

FIG. 3 is a bottom view of WCT shown in FIG. 1;

FIG. 18A exemplifies a format of welding condition data Dcon, wherein one character of Dcon is represented by vertical data group VDG of six channels CH1-CH6, and one text of Dcon is represented by six horizontal data groups HDG's plus start code STX, end code EXT, and parity code HPC;

FIG. 18B shows a parity check flow for serially transmitted data (Dcon);

FIG. 19 shows a verification flow for welding condition data Dcon;

FIG. 20 shows a verification flow for welding operation to be based on given set data Dset;

FIG. 21 shows a verification flow for welding current Dcur;

FIG. 22 is a control flow for determining new firing angle data Dfia* of SCR's shown in FIGS. 17A and 17B.

DETAILED DESCRIPTION OF THE PREFERRED EMBODIMENTS

Figure 4:
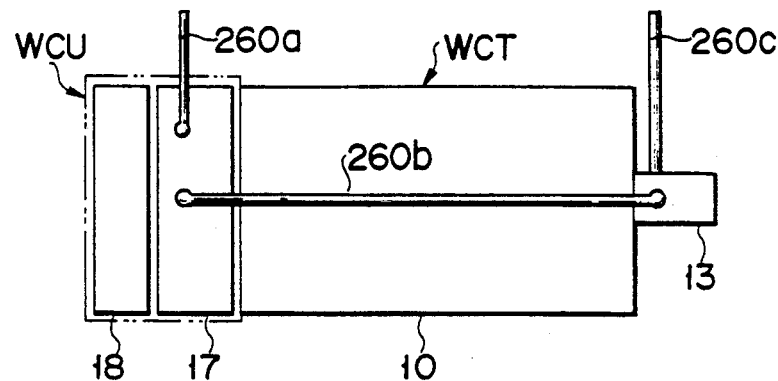
FIG. 4 is a top view of the assembly shown in FIG. 1, wherein a power module (17) and control module (18) contained in WCU are shown.

Preferred embodiments of the present invention will be described below with reference to the accompanying drawings. In the description, the same or similar elements are indicated by the same or similar reference numerals, to thereby avoid redundant explanations.

FIG. 1 is a perspective view of a resistance welder assembly of weld control transformer 10 (hereinafter referred to as WCT) and weld control unit 17+18 (hereinafter referred to as WCU). Gun 1 having welding electrodes 1X is connected to WCT via cable 2. A cooling vessel (not shown) in WCT is coupled via water pipe 260 to a cooling vessel (not shown) in WCU. External cool water is fed into the cooling vessel of WCU, and the water is fed, via pipe 260, to the cooling vessel of WCT. Then, warm water, heated by SCR's in WCU and by a transformer in WCT, is flowed out from WCT.

According to the cooling configuration of FIG. 1, only one pipe line is sufficient for feeding the cooling water to one assembly of WCU and WCT.

FIG. 2 is a side view of WCT shown in FIG. 1. FIG. 3 is a bottom view of WCT. Bottom end 14 of WCT is provided with two steel studs 11a and 11b, thermostat signal wire 12, and tapping holes 15. Studs 11a and 11b are used for connecting the primary winding of WCT to two terminals of SCR's (or thyristors) contained in a power module (17) of WCU. Signal wire 12 of a thermostat in WCT is connected to a control module (18) of WCU. This thermostat is used for protecting WCT from overheating. Tapping holes 15 are used for fixing WCU to WCT.

Figure 5:
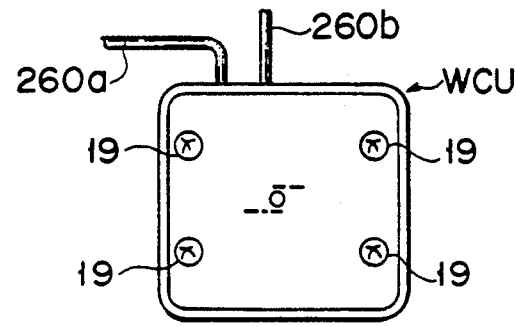
FIG. 5 is a side view of WCU shown in FIG. 4.

FIG. 4 is a top view of the assembly of WCT and WCU shown in FIG. 1. As is shown, WCU contains power module 17 and control module 18. FIG. 5 is a side view of WCU. WCU (power module 17 and control module 18) is mounted on bottom end 14 of WCT and fixed to WCT, using screws 19 (FIG. 5) and tapping holes 15 (FIG. 3).

Figure 6:
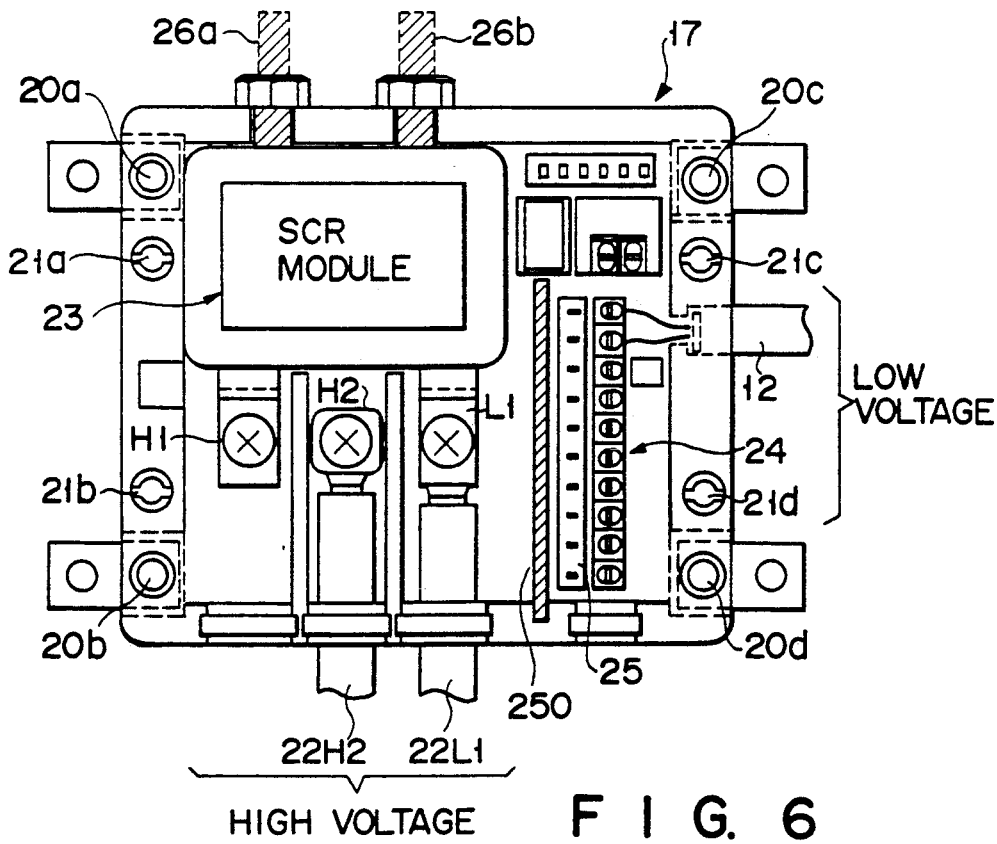
FIG. 6 illustrates details of the inside of the power module (17) shown in FIG. 4.

FIG. 6 shows details of the inside of power module 17. Screws 19 shown in FIG. 5 pass through screw holes 20a-20d and reach to tapping holes 15 shown in FIG. 3. Other tapping holes 21a-21d are provided for fixing control module 18 with power module 17, using other screws (210a-210d in FIG. 9).

High voltage power line 22L1 is connected to terminal L1 of SCR module 23. Terminals L1 and H1 are connected to two ends of cross-coupled or antiparallel-connected SCR's (thyristors) contained in the plastic housing of module 23. (Detailed circuit connections of the SCR's will be described later with reference to FIG. 17A.) Terminals H1 and H2 are connected to studes 11a and 11b of FIG. 3, to which the primary winding of WCT is connected. High voltage AC power (e.g., 480 V AC) is applied to terminal L1 and H2, via power lines 22L1 and 22H2.

Thermostat signal wire 12 from WCT is connected to terminal block 24 of low voltage connector 25. Other signals such as a shunt trip signal are also connected to terminal block 24. Low voltage terminal block 24 is isorated by insulation board (e.g., plastic board) 250 from high voltage terminals L1, H1, and H2. Insulation board 250 prevents the lead chip of the low voltage signal wire (12) from accidental touching to the high voltage terminals.

Figures 7A, 7B:
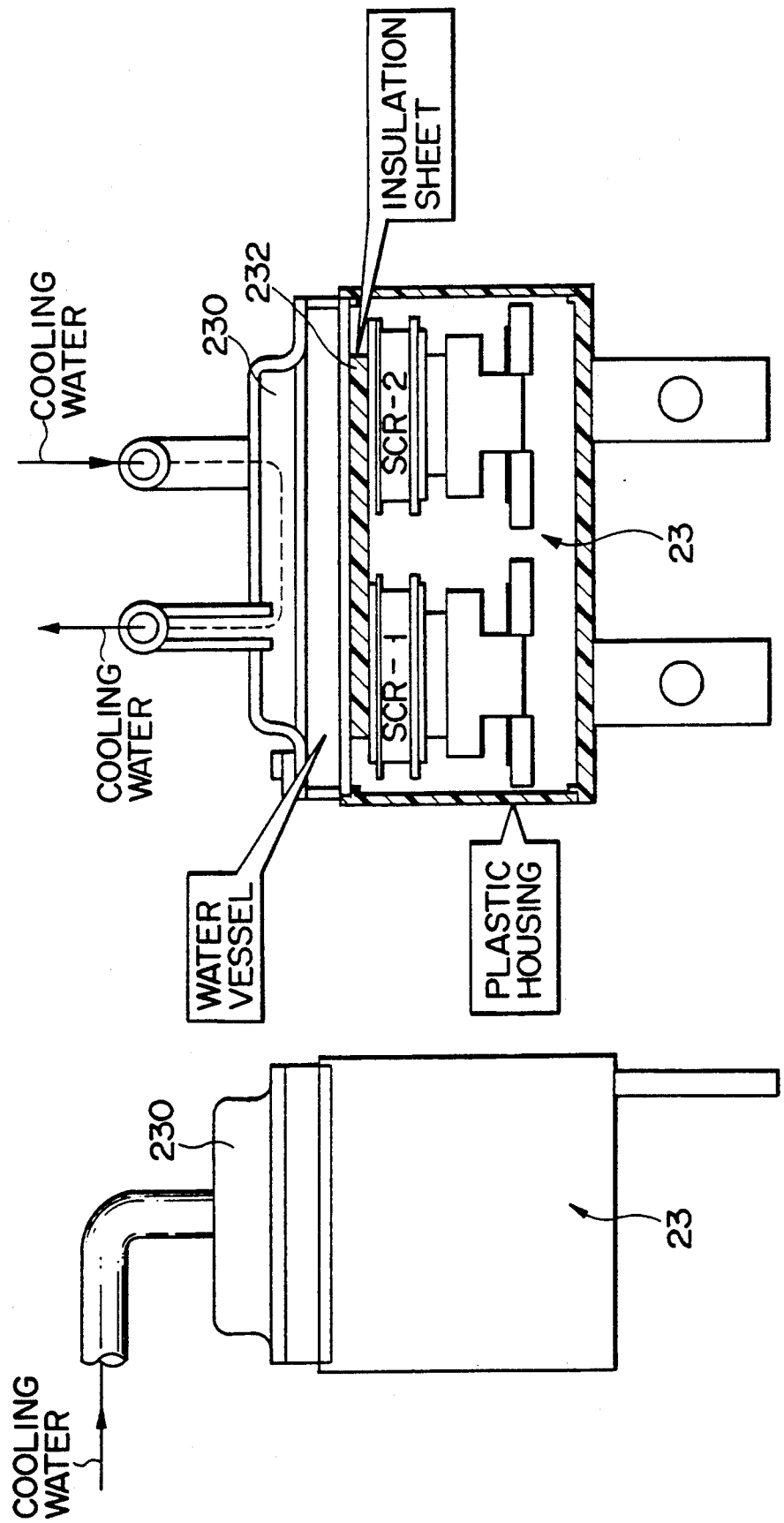
FIG. 7A is a side view of an SCR cooling structure contained in a SCR module (23) shown in FIG. 6.
FIG. 7B illustrates the inside of the SCR cooling structure of FIG. 7A.

SCR module 23 in FIG. 6 contains a pair of cross-coupled SCR's and their cooling structure. Cooling water enters one of nipples 26a and 26b, and goes out from the other thereof. FIG. 7A is a side view of SCR cooling vessel 230 through which cooling water flows. FIG. 7B illustrates the inside of the cooling structure. Vessel 230 is made of metal such as copper. SCR-1 and SCR-2, arranged inside the plastic housing of module 23, indirectly but closely contact the cooling plane of vessel 230, via insulation sheet 232. Sheet 232 can be a mica sheet or Mylar(TM) film.

According to the configuration of FIG. 7B, cooling vessel 230 is integrated with SCR's in the plastic housing of module 23, such that vessel 230 is close to SCR's. Then, the total size of module 23 can be made compact. In addition, SCR's are enclosed by the plastic housing having good electrical insulation property. For this reason, even if power module 17 is enclosed in a metal case, SCR module 23 can be encapusulated therein without large space between the metal case wall and the plastic housing of module 23. This permits the size of power module 17 to be compact.

Figure 8:
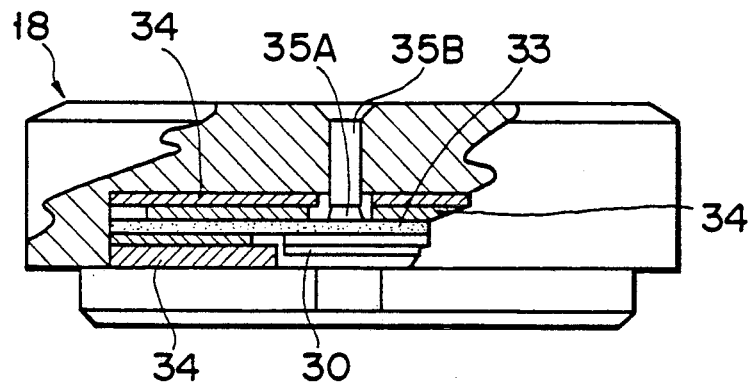
FIG. 8 partly illustrates the inside of the control module (18) shown in FIG. 4.

FIG. 8 partly illustrates the inside arrangement of control module 18 shown in FIG. 4. Control module 18 includes printed circuit board (PC board) 33 on which EPROM 30, LED 35A, microprocessing unit MPU (not shown), potentiometers (not shown), etc. are mounted. PC board 33 is suspended by soft rubber pieces 34 in the given space of module 18. Module 18 can be made of light plastic molding. Just above LED 35A on board 33, plastic lens 35B is located for indicating the activation of WCU to users. Or, lens 35B can be used for an optical data transmission interface.

The operation of each WCU depends on the contents stored in EPROM 30. Thus, by rewriting EPROM 30 or by replacing EPROM 30 with another EPROM, the operation of WCU can be readily changed or modified.

Figure 9:
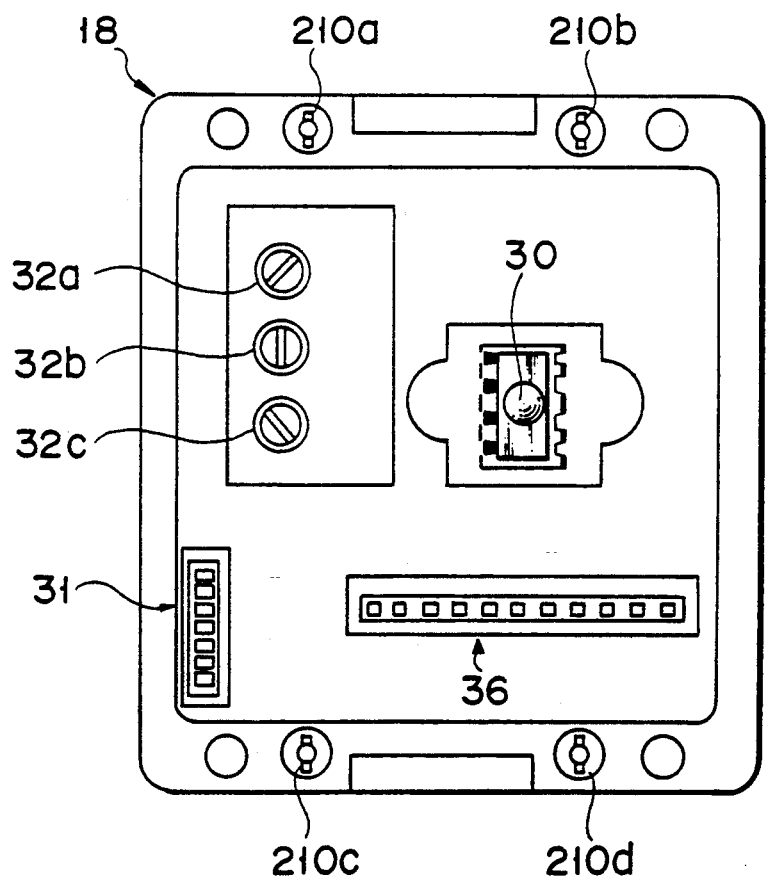
FIG. 9 is a bottom view of the control module (18) shown in FIG. 8.

FIG. 9 is a bottom view of control module 18. Nobs 32a-32c of the potentiometers on board 33 are used for presetting a welding current, the maximum welding current, and the minimum welding current. Address switch 31 is used for assigning a specific unit number (e.g., 0 to 15) to each of control module 18. When many WCU's are connected to machine control interface MCI (host computer), MCI can identify respective WCU's by their unit numbers assigned by switch 31.

Signal lines of the circuit on PC board 33 are connected to low voltage connector 36 shown in FIG. 9. When control module 18 (FIG. 9) is coupled to power module 17 (FIG. 6), connector 36 engages connector 25. Module 18 can be mechanically fixed to module 17 using screws 210a-210d and tapping holes 21a-21d. The electrical connection interface between connectors 25 and 36, as well as the mechanical connection interface between modules 17 and 18, are standardized. Thus, any of WCU's can be connected to any of WCT's. If one WCU whose EPROM 30 contains one program is replaced with another WCU whose EPROM 30 contains another program, the welding performance of WCT can be changed by this simple replacement of WCU.

Figure 10:
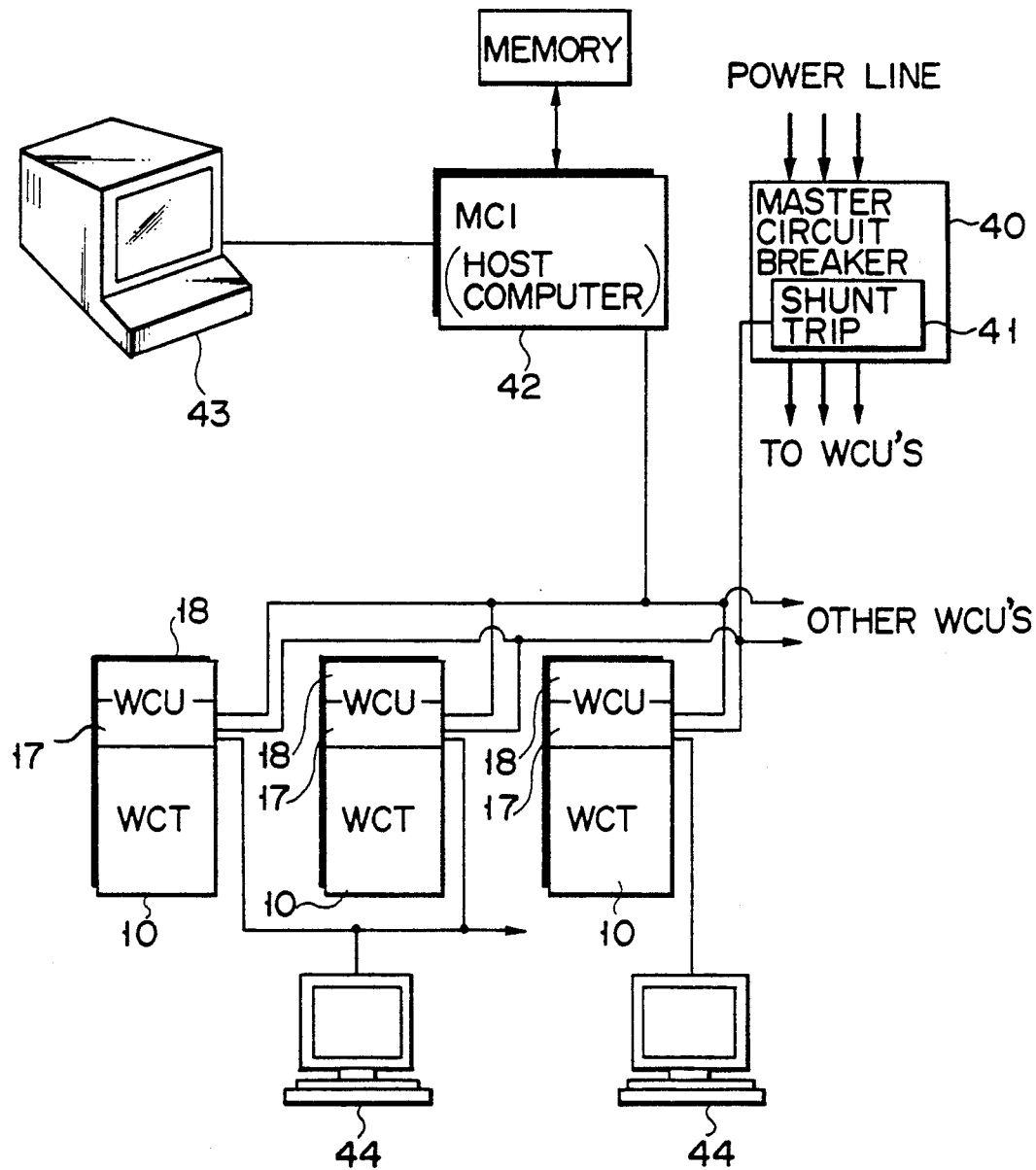
FIG. 10 shows a schematic diagram of a welding system according to the present invention, in which plural assemblies of WCT's and WCU's are parallel connected to machine control interface MCI.
Figure 11:
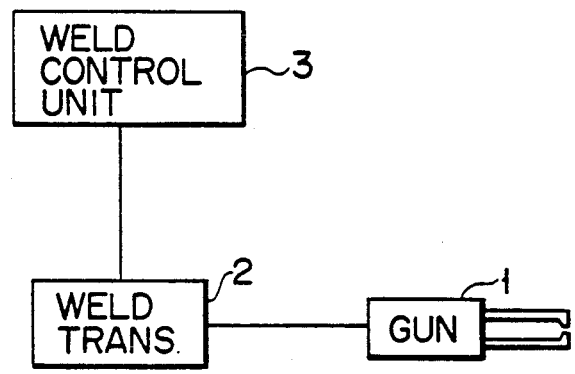
FIG. 11 shows a basic configuration of a conventional resistance welder.

FIG. 10 is a schematic diagram of a welding system according to the present invention. In this embodiment, three assemblies of WCT's and WCU's are parallel connected, and the connected assemblies are coupled to machine control interface MCI 42 to which terminal device 43 is connected. (These WCT/WCU assemblies may be daisy chained, via a conventional serial line of, for example, RS-232 or RS-422.)

Power modules 17 of WCU's are wired-OR-connected, and coupled to shunt trip circuit 41 in master circuit breaker 40. Terminal devices 44 are connected to some of WCU's. If any of SCR's of WCU's is broken and short-circuited WCU containing the broken SCR sends a shunt trip signal to shunt trip circuit 41 so that the power supplied to WCT's is cut off.

In the embodiment of FIG. 10, a ladder logic program for MCI 42 and welding program stored in each control module 18 of WCU's are executed, using terminal device 43. Even when many WCU's are used at once, terminal device 43 can communicate with a prescribed control module 18, via MCI 42, by designating its specific unit number.

When a predetermined welding sequence is to be performed using a serial transmission line, MCI 42 adds the unit number of module 18 to be actuated to a serial transmission text, and the result transmission text is sent to the serial transmission line. Although the transmission text is sent to all control modules 18, only one module 18, identified by the unit number added to the text, can respond to this text. Then, only this one module 18 executes its welding according to the contents of the text.

When two or more WCT's have to perform their welding simultaneously, MCI 42 sends address data containing two or more specific unit numbers to all control modules 18. Then, WCT's identified by the unit numbers execute their welding. If all WCT's must perform their welding at once, special address data designating all unit numbers (e.g., data of "99") is sent from MCI 42 to all control modules 18.

MCI 42 can make inquiries on each control module 18 about whether or not welding is completed, whether or not good welding has been performed, etc..

Figure 13:
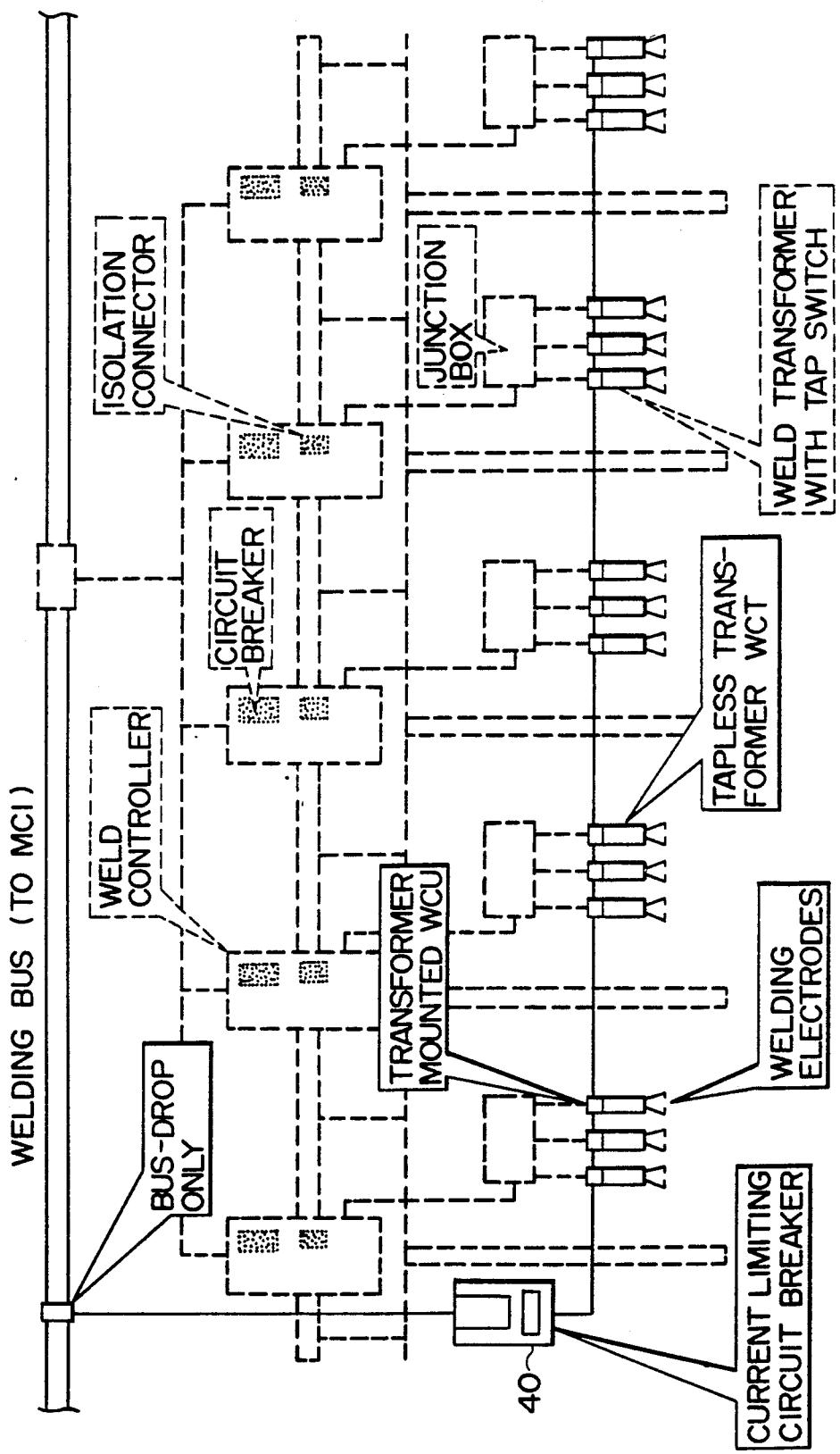
FIG. 13 shows a resistance welder system using many assemblies of WCT's and WCU's, wherein a system of this invention is illustrated by the solid lines, while a conventional system is illustrated by the broken lines.

FIG. 13 shows a resistance welder system using many assemblies of WCT's and WCU's. This system can be used in, for example, an automobile factory. In this system, the configuration of an embodiment according to this invention is illustrated by solid lines, while a conventional configuration is illustrated by broken lines.

As is shown by the broken lines in FIG. 13, according to a conventional system, three weld transformers with tap switches are selectively coupled to one of weld controllers, via a junction box, and these weld controllers are parallel connected to MCI, via welding bus. According to this conventional system, one weld controller is common to three weld transformers. For this reason, even when the control characteristic of the weld controller matches one of three transformers, it cannot match the remaining two transformers if the welding performance of three transformers are different from one another.

According to the welder system of this invention, as is shown by the solid lines in FIG. 13, one WCU (weld controller) is exclusively provided for one WCT (tapless weld control transformer), and all assemblies of WCU and WCT are connected to MCI, via single serial data transmission line (e.g., RS-422). The control performance of each WCU can be optionally determined in accordance with the stored program in EPROM 30 of control module 18 (FIG. 9).

On the other hand, MCI can gather all welding data of all WCU's, and can separately send instruction or welding data back to respective WCU's. Consequently, even if the welding performance of all WCT's are different from one another, the best performance for each WCT can be achieved.

Figure 14:
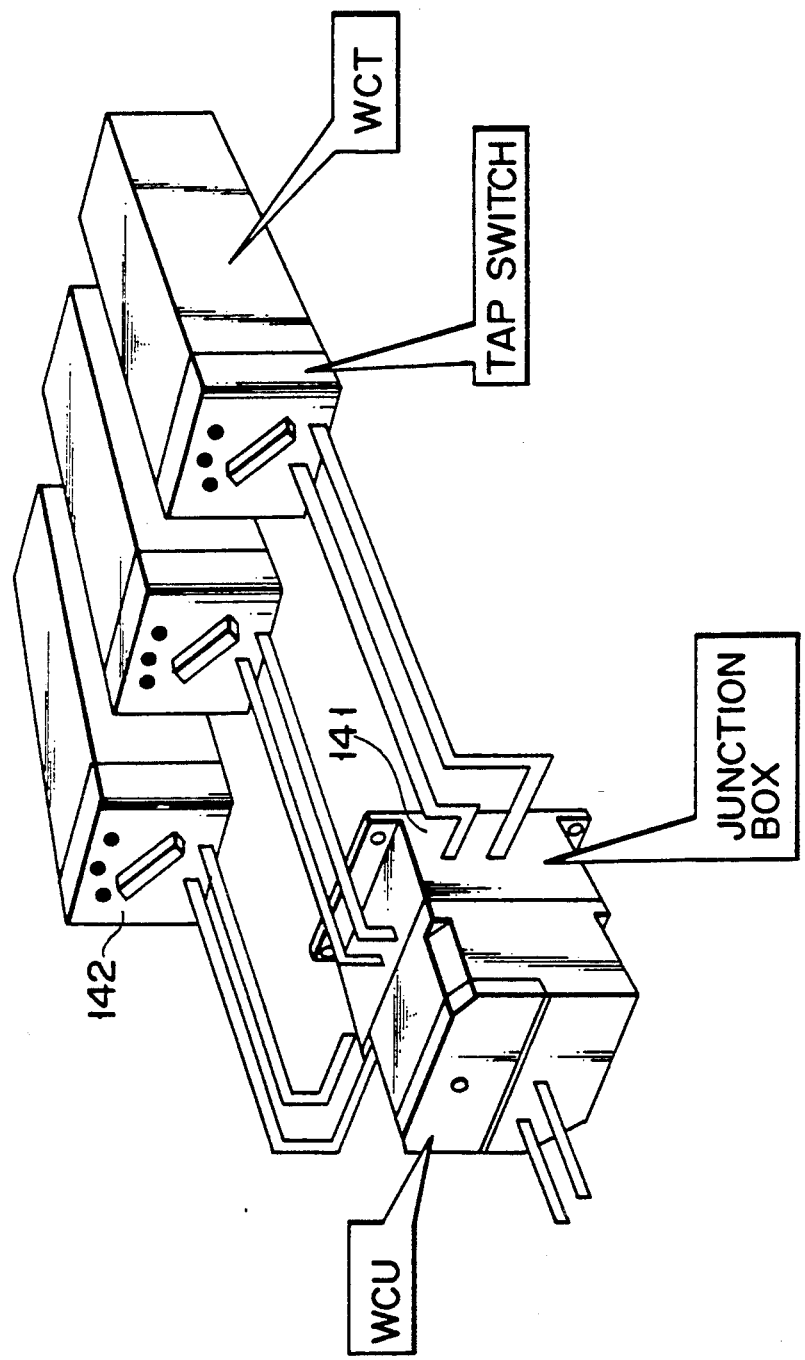
FIG. 14 is a perspective view of a combination of one WCU and three WCT's each having a tap switch, wherein the connection between WCU and one of WCT's is selected by the junction box.

FIG. 14 is a perspective view of a combination of one WCU and three WCT's each having tap switch 142. In the figure, connection between WCU and one of WCT's is selected by junction box 141. WCU of the present invention can be applied to such a configuration as shown in FIG. 14. Thus, the compact and program-rewritable features of WCU of this invention are still advantageous even if junction box 141 and tap switch 142 are employed.

Figure 12:
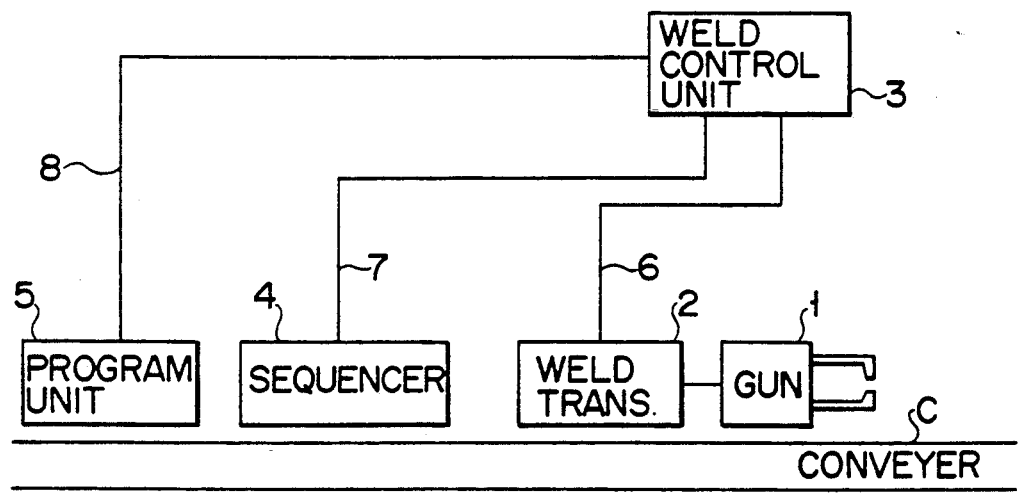
FIG. 12 shows a conventional resistance welder system used in, for example, an automobile factory.
Figure 15:
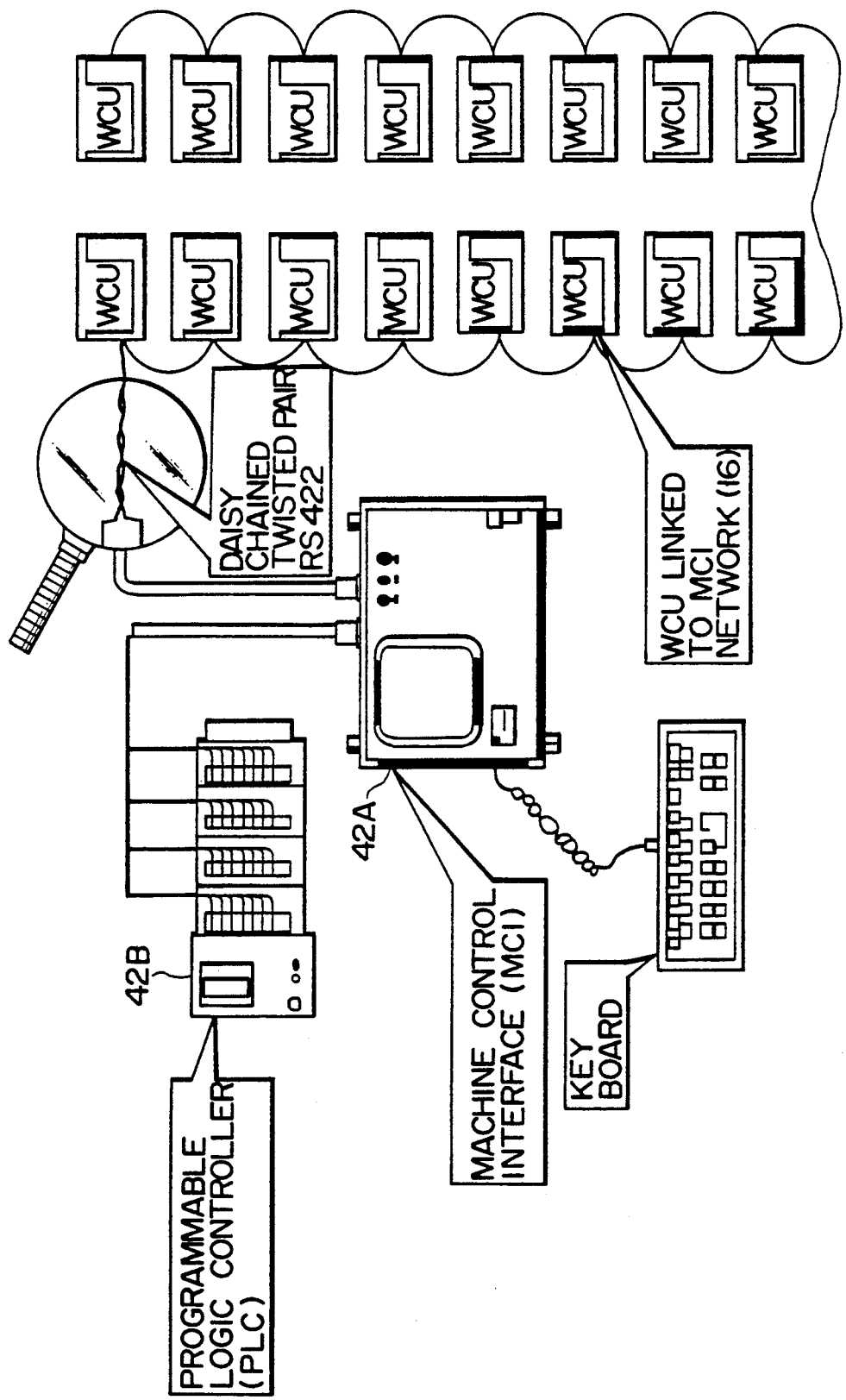
FIG. 15 shows a schematic diagram of a welding system according to the present invention, in which plural assemblies of WCT's and WCU's are connected to machine control interface MCI, via daisy-chained serial transmission lines.

FIG. 15 shows a schematic diagram of a welding system according to the present invention, in which plural assemblies of WCT's and WCU's are connected to machine control interface MCI, via daisy-chained serial transmission lines (RS-422). MCI 42A is provided with programmable logic controller PLC 42B. PLC 428 is used for controlling the on/off of welding electrodes 1X of each WCT and/or controlling the actuation of conveyer C as shown in FIG. 12.

Figure 16:
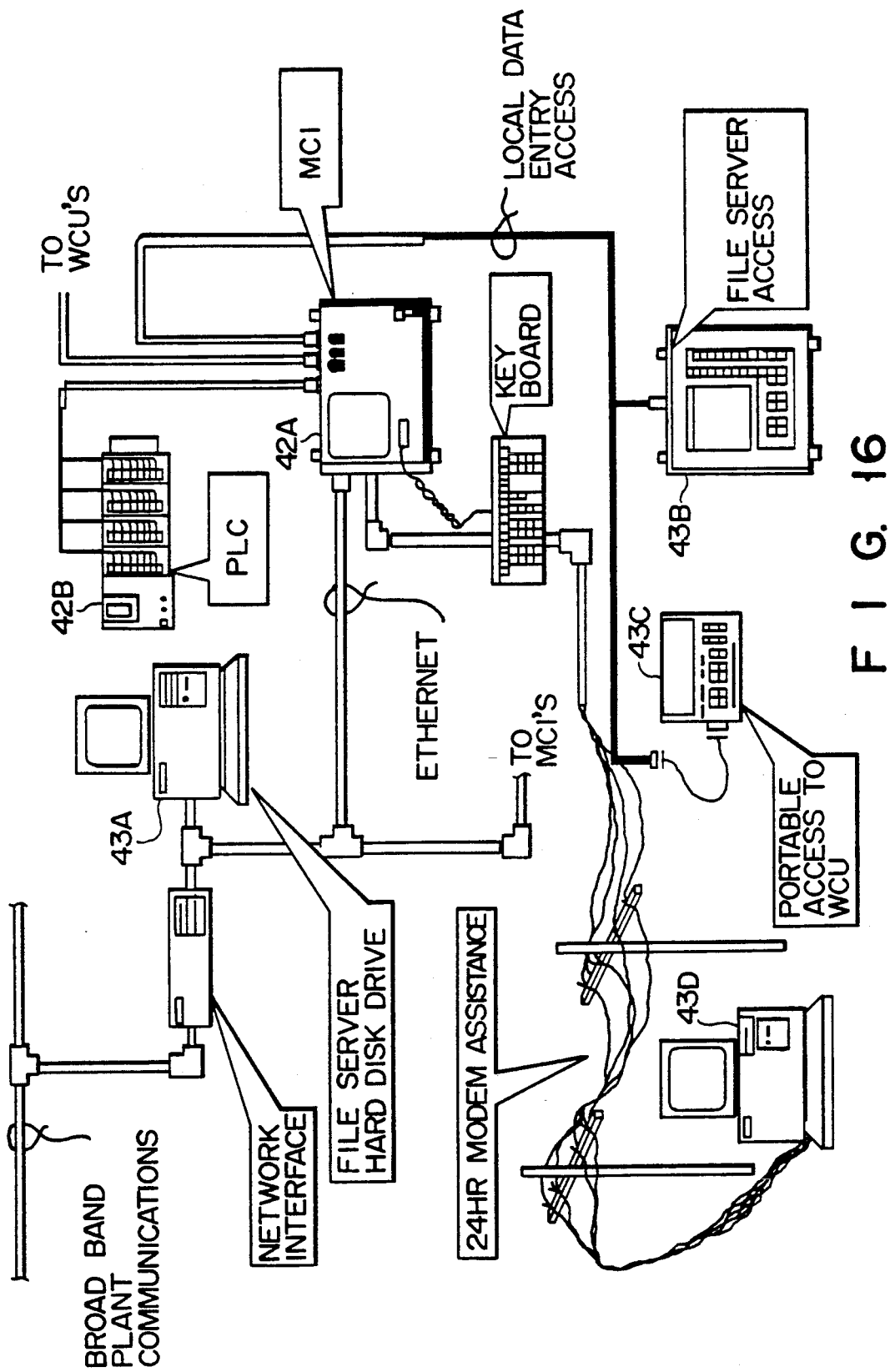
FIG. 16 illustrates typical peripheral devices of MCI shown in FIG. 15.

FIG. 16 illustrates typical peripheral devices of MCI shown in FIG. 15. File server harddisk drive 43A, other MCI's, etc., are connected to MCI 42A, via a local area network (e.g., ETHERNET). File server access device 43B, access device 43C for WCU, remote I/O terminal 43D, etc., are also connected to MCI 42A. Thus, MCI 42A can gather various information from many peripheral devices.

Figure 17A:
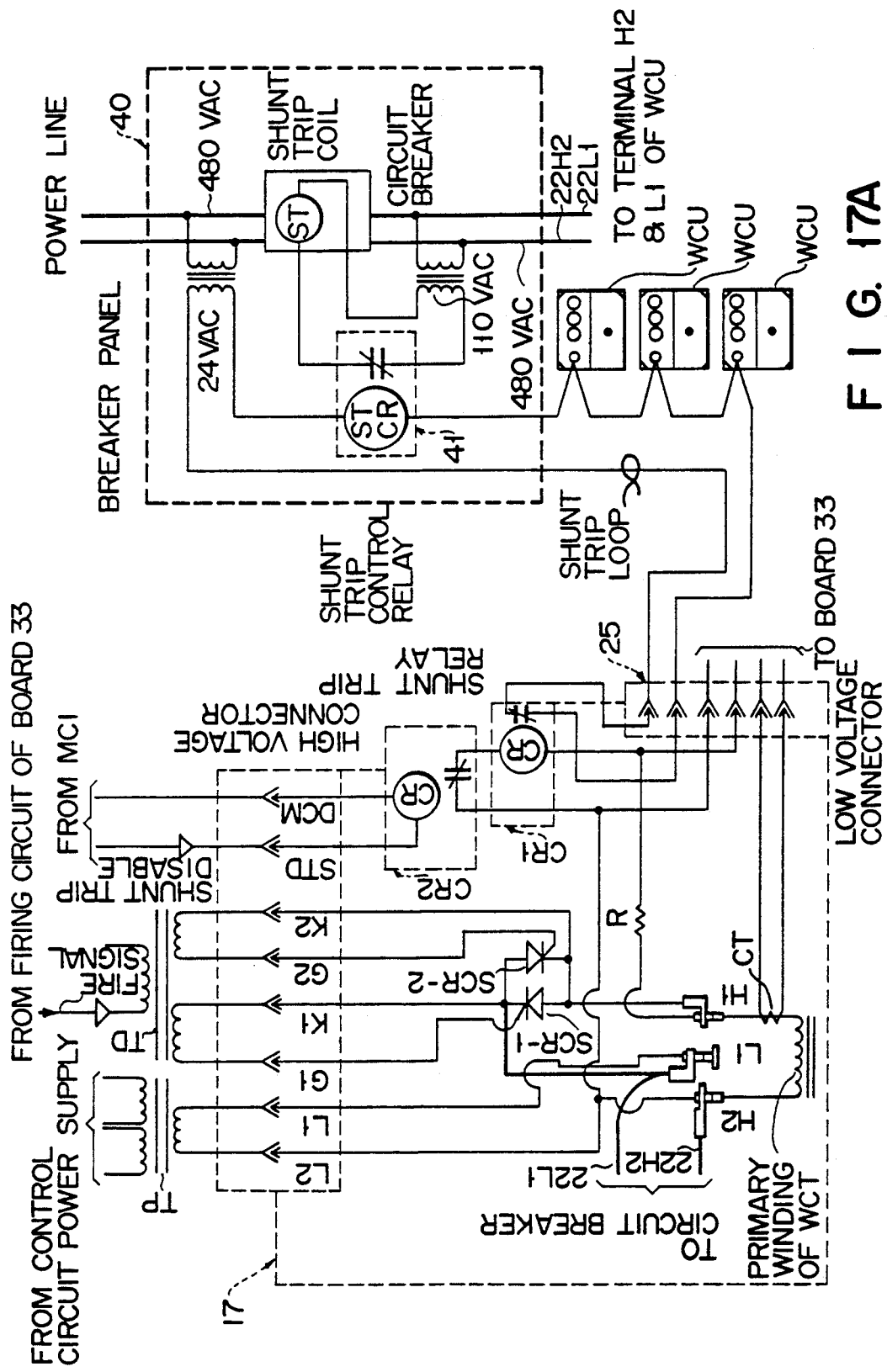
FIG. 17A is a circuit diagram of WCU regarding the primary circuit of WCT and the shunt trip circuit.

FIG. 17A is a circuit diagram of WCU regarding the primary circuit of WCT and the shunt trip circuit. One terminal of the primary winding of WCT is connected to terminal H1 of cross-coupled SCR-1 and SCR-2. The gate and cathode of SCR-1 are connected to the first secondary winding of driver transformer TD, via contacts G1 and K1 of a high voltage connector. The gate and cathode of SCR-2 are connected to the second secondary winding of driver transformer TD, via contacts G2 and K2 of the high voltage connector.

The other terminal of the primary winding of WCT is connected to terminal H2. Terminal H2 is connected to one end of the secondary winding of a power transformer TP, via contact L2 of the high voltage connector. The other end of the secondary winding of transformer TP is connected to terminal L1, via contact L1 of the high voltage connector. The primary winding of transformer TP is connected to, for example, AC 110 V power line.

Terminals H1 and H2 are connected to the power circuit of breaker 40, via cables 22H1 and 22H2. Terminal H1 is connected, via resistor R, to one end of coil CR of shunt trip relay CR1. Terminal H2 is connected, via the relay contact of shunt trip relay CR2, to the other end of coil CR of relay CR1. Coil CR of relay CR2 is driven by MCI (42) shown in FIG. 15, etc.. The relay contact of relay CR1 is inserted in a shunt trip loop formed by all WCU's. The shunt trip loop contains a coil of shunt trip control relay 41 and 24 V AC power source. The relay contact of relay 41 is inserted between a shunt trip coil of circuit breaker 40 and 110 V AC power source.

A voltage signal appearing across the primary winding of WCT is fed to the circuit in PC board 33, via low voltage connector 25. A current flowing through SCR's is detected by current transformer CT. A detected current signal is supplied from CT to PC board 33, via low voltage connector 25.

Figure 17B:
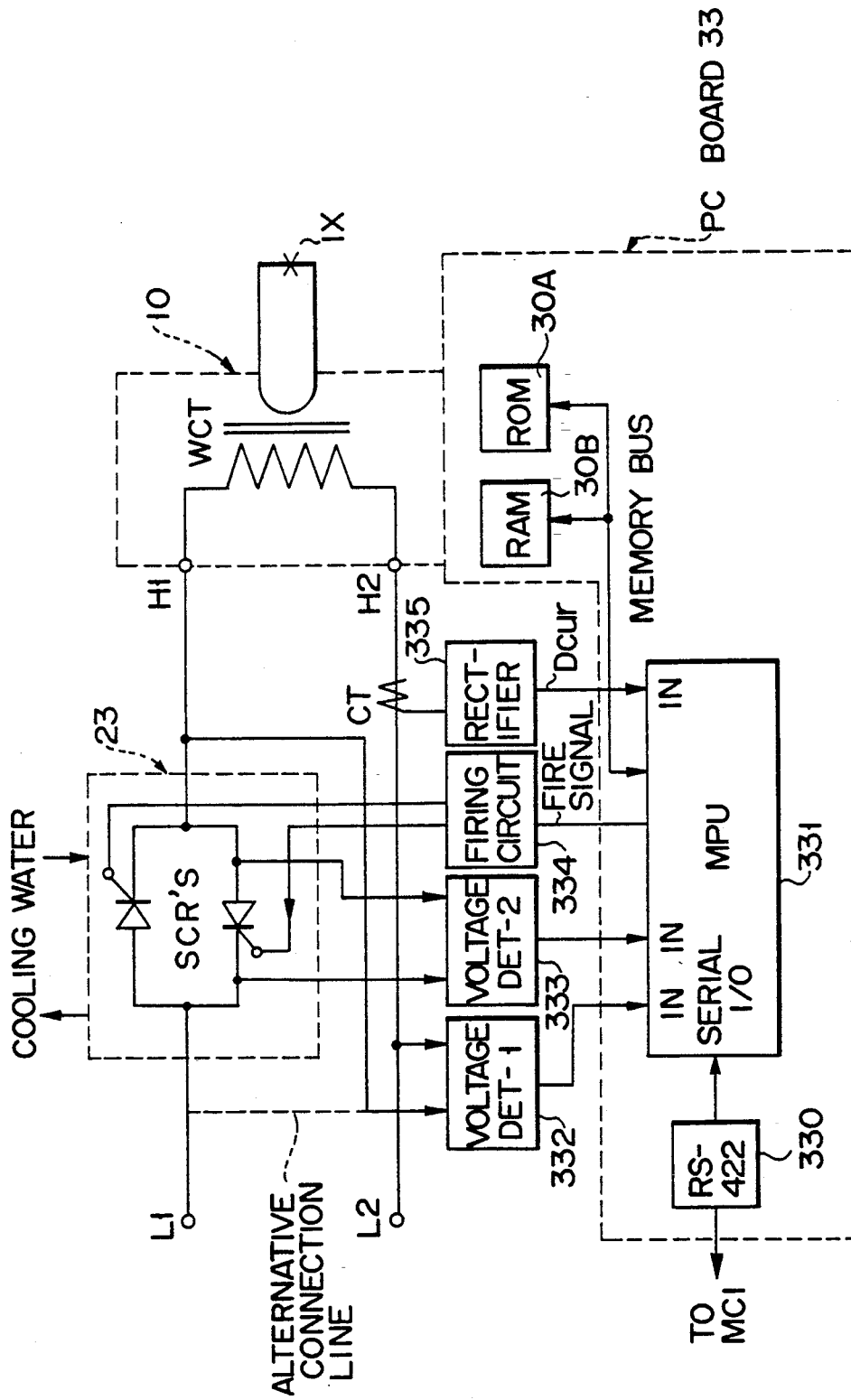
FIG. 17B is a circuit diagram of PC board 33 shown in FIG. 8, which also shows a firing circuit (335) for the SCR module (23) in FIG. 6.

FIG. 17B is a schematic circuit diagram of PC board 33 shown in FIG. 8. The voltage signal at the primary winding of WCT is supplied to microprocessing unit MPU 331, via first voltage detector 332. A signal of the voltage appearing across SCR's is supplied to MPU 331, via second voltage detector 333. The current of SCR's is supplied to MPU 331, via rectifier 335. MPU 331 is coupled to MCI 42A in FIG. 15, etc., via RS-422 serial communication device 330. A predetermined operation sequence of MPU 331 can be stored in ROM 30A. Data sent to or obtained from MCI 42A can be stored in RAM 30B.

MPU 331 of PC board 33 receives information of the voltage and current of WCT and SCR's. Consequently, MPU 331 can detect the power factor from the phase difference between the voltage and current, the amount of the welding current etc.. The detected data is sent to MCI 42A, via RS-422 line. MPU 331 can also control the firing of SCR's, via firing circuit 334.

From the current data from MPU 331, MCI 42A can detect an overcurrent caused by, for example, a breakdown of SCR's. When the overcurrent is detected, MCI 42A stops to send a shunt trip disable signal to shunt trip relay CR2 so that the contact of CR2 is closed. At this time, if a certain voltage appears across the primary winding of WCT, shunt trip relay CR1 can be excited so that the contact of CR1 is opened. Then, the shunt trip loop in FIG. 17A is opened, and circuit breaker 40 suspends the power supply to all WCU's and WCT's.

FIG. 18A exemplifies a format of welding condition data Dcon. In this example, one character of Dcon is represented by vertical data group VDG of six channels CH1-CH6, and one text of Dcon is represented by six horizontal data groups HDG's plus start code STX, end code EXT, and horizontal parity code HPC. The data of CH1 to CH6 is serially transmitted form WCU to MCI, or vice versa.

FIG. 18B shows a parity check flow for serially transmitted data (Dcon). First, a microcomputer in MCI (FIG. 15) initializes parity code HPC to zero (ST10). The microcomputer reads one character of the current text shown in FIG. 18A (ST12). Then, the microcomputer detects the exclusive OR (EX-OR) of CH1-CH6 of the character so that the vertical parity (e.g., even number parity) of the character is checked (ST14).

When the parity is OK (YES), the microcomputer checks whether the read data (VDG) is the next one of end code EXT (ST16). If the current read data is not the next one of EXT, new parity code HPC is generated from the logical sum of current HPC and the EX-OR of current VDG. Then, current HPC is replaced with new HPC (ST18), and the flow returns to step ST12.

The content of CH1 of code HPC indicates the EX-OR of all bits in horizontal data group HDG of CH1. Similarly, the contents of CH2-CH6 of HPC indicate the EX-OR's of HDG's of CH2-CH6.

When the parity check at step ST14 results in wrong (NO), an error message is displayed at, for example, a CRT of terminal device 43A in FIG. 16 (ST24), and the same data transmission can be retried.

When the current read data is the next one of end code EXT (YES at ST16), the microcomputer checks whether the current read data coincides with current parity check code HPC (ST20). When the current data coincides with HPC (YES), the microcomputer determines that no error is involved in the transmitted text (ST22). If the current data differs from HPC (NO at ST20), then an error message is displayed (ST24), and the same text transmission can be again performed.

Figure 18C:
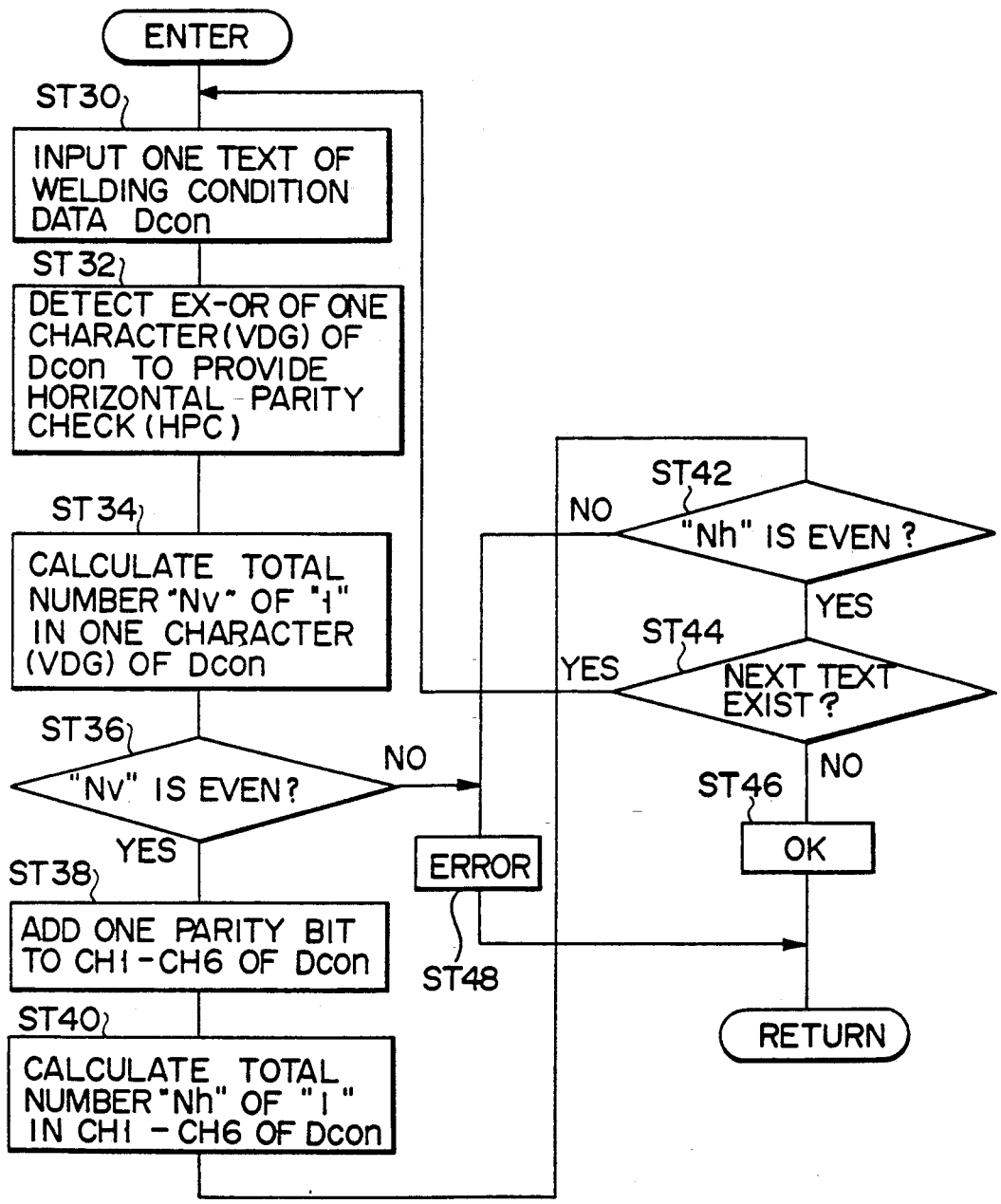
FIG. 18C shows another parity check flow for serially transmitted data (Dcon)

FIG. 18C shows another parity check flow for serially transmitted data (Dcon). First, one text of welding condition data Dcon is input to the microcomputer of MCI 42 (ST30). The microcomputer detects the EX-OR of all bits in one character (VDG) of Dcon to provide horizontal parity check code HPC (ST32). Then, the total number "Nv" of data "1" in the current one character is calculated (ST34).

The microcomputer checks whether the calculated number "Nv" is even (ST36). When "Nv" is an even number (YES), the microcomputer adds one parity bit to the current channel (CH1-CH6) of data Dcon (ST38). Then, the total number "Nh" of data "1" in the current channel (CH1-CH6) is calculated (ST40).

The microcomputer checks whether the calculated number "Nh" is even (ST42). When "Nh" is an even number (YES), the microcomputer checks whether a next text subsequent to the current text exists (ST44). When the next text exists (YES), the flow returns to step ST30. When no text exists (NO), the microcomputer determines that no error is involved in the transmitted text (ST46).

If the number "Nv" is odd (NO at ST36) or the number "Nh" is odd (NO at ST42), then an error message is displayed (ST48), and the same text transmission can be again performed.

Incidentally, MPU 331 (FIG. 17B) of each WCU can also perform the parity check of FIG. 18B/C.

FIG. 19 shows a verification flow for welding condition data Dcon. The microcomputer of MCI 42A serially transmits welding condition data Dcon to WCU. Then, MPU 331 on PC board 33 of WCU (FIG. 17B) receives data Dcon (ST50). Allowable error value Derr with respect to Dcon is input to MPU 331 (ST52). Typically, about 10% of Dcon can be used for the value of Derr. MPU 331 also receives actual welding data Dwel (ST54).

The primary winding current and the power factor of WCT, etc. are contained in data Dwel. The primary winding current can be detected by current transformer CT shown in FIG. 17B. The power factor can be detected from the phase difference between the primary winding current and the primary winding voltage detected by detector 332.

MPU 331 detects the difference between data Dwel and Dcon (ST56). Then, MPU 331 checks whether the amount of the difference |Dwel−Dcon| is less than error value Derr (ST58). When the difference is less than Derr (YES), MPU 331 determines that the actual welding is correctly performed in accordance with welding condition data Dcon. If the difference is larger than Derr (NO), this result is sent to MCI 42A in, for example, FIG. 16, and an error message is displayed at a CRT of terminal device 43A (ST60). Then, MCI 42A can send a command to MPU 331 to again perform the same welding operation.

FIG. 20 shows a verification flow for welding operation to be based on given set data Dset. Given set value data Dset for determining an actual welding current (primary current of WCT) is input to MPU 331 in FIG. 17B (ST70). MPU 331 receives welding current data Dcur detected by current transformer CT in FIG. 17B (ST72). MPU 331 integrates (or accumulates) the value of Dcur for one cycle of the welding current, for example, and calculates average value Dave of Dcur obtained during the one cycle (ST74).

MPU 331 checks whether value Dave is larger than the 90% of Dset (ST76). When Dave is larger than it (YES), MPU 331 determines that WCT has performed a good weld (ST78) and rewelding should not be done (ST80). If Dave is less than the 90% of Dset (NO), MPU 331 determines that WCT has performed a bad weld (ST82) and rewelding should be done (ST84).

When the bad weld is detected by MPU 331, MCI 42A is informed of this bad weld, and sends a reweld command to MPU 331 of a specific WCT by which the bad weld has been done. None of MPU's, whose WCT performs a good weld, receives the reweld command from MCI 42A.

FIG. 21 shows a verification flow for welding current Dcur. MCI 42A sends maximum current limit data Dmax and minimum current limit data Dmin. MPU 331 in FIG. 17B receives data Dmax (ST90) and data Dmin (ST92). Then, MPU 331 receives actual welding current data Dcur from current transformer CT (ST94).

MPU 331 checks whether the value of Dcur falls between Dmax and Dmin (ST96). When Dcur falls between Dmax and Dmin (YES), MPU 331 determines a normal welding current flows though WCT (ST98). If Dcur is larger than Dmax or less than Dmin (NO), MPU 331 determines an abnormal welding current flows (ST100). In this case, MPU 331 sends alarm information to MCI 42A (ST102).

Figure 23:
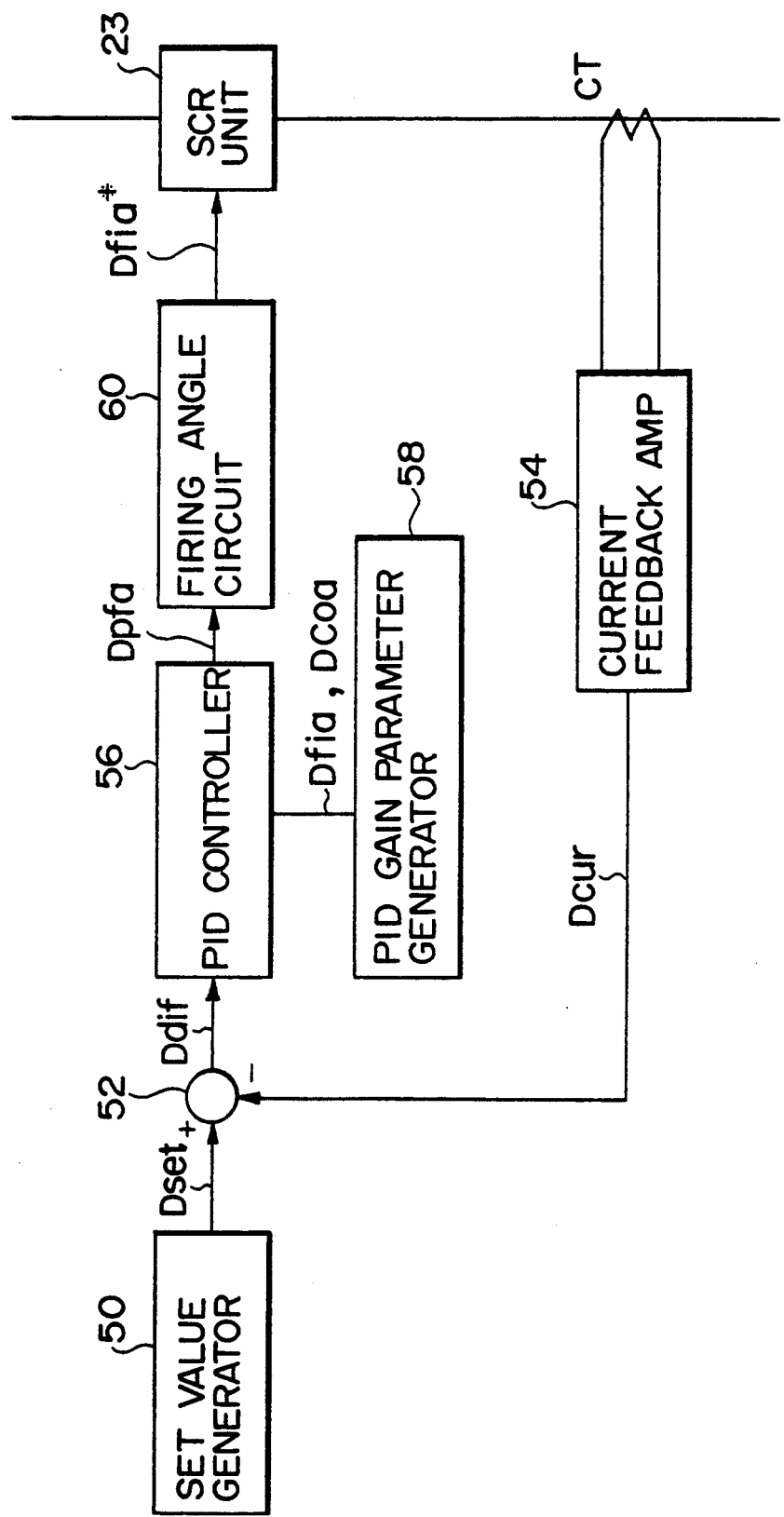
FIG. 23 is a block diagram which performs the sequence of the flow shown in FIG. 22.

FIG. 22 is a control flow for determining new firing angle data Dfia* of SCR's shown in FIG. 17A/B. FIG. 23 is a block diagram for performing the sequence of the flow shown in FIG. 22. Although not shown in FIG. 23, the operation of this block diagram can be assisted by MPU 331 in FIG. 17B.

Set value data Dset obtained from set value generator 50 is input to the positive input of summing point 52 (ST110). Firing angle data Dfir and conduction angle data Dcoa for SCR's are supplied from PID gain parameter generator 58 to PID controller 56 (ST112, ST114). Welding current data Dcur is supplied, via current feedback amplifier 54, from current transformer CT to the negative input of summing point 52 (ST116).

Difference Ddif between Dset and Dcur is detected by summing point 52 (ST118). PID controller 56 receives Ddif. Controller 56 calculates power factor angle data Dpfa from Dcur, Dfia, and Dcoa (ST120). Calculated Dpfa is input to firing angle circuit 60. In circuit 60, subsequent firing angle data Dfia* is calculated from Dfia, Dpfa, and Ddif according to the PID control (ST122). SCR unit (module) 23 operates with a new firing angle determined by the calculated Dfia*.

The disclosed embodiment of the present invention can have the following features.

(1) WCU can be detachably mounted on WCT, and the function of WCT can be separated from the input/output function of the control by WCU. This allows cost savings in many applications.

(2) The size of WCU can be made smaller than a conventional control device, chiefly because power module 17 and control module 18 are encapusulated within a compact plastic housing of WCU. This feature allow space savings on a welder machine.

(3) The electrical and mechanical connection interfaces between WCU and WCT can be standardized, so that any one of WCU's can be optionally connected to any one of WCT's. This feature eliminates compatibility problems between WCU and WCT.

(4) All WCU's can have a common electrical configuration, so that one control center (a host computer or a machine control interface with a programmable logic controller) per a group of controls can gather welding data from WCU's. The control center can manage each operation of WCU's according to the gathered data and/or preset data.

(5) Each WCT is provided with its own WCU, and WCT can be controlled by programs stored in the memory of a microprocessor contained in WCU. The contents of the programs can be determined exclusively for each WCT. Thus, better control over welds can be achieved at no cost penalty over conventional instalations of, e.g., three transformers per control.

(6) Power and cooling water connections are shared by an assembly of WCT and WCU. Then, the power and water only have to go to one place wherein the WCT/WCU assembly is located.

(7) WCT's are provided with their own WCU's, and WCT's can be controlled by specific programs stored in WCU's. The contents of each program can be determined to be based on specific characteristics of each WCT. Thus, operation conditions of WCT's can be diagnosticated by the specific programs, so that better protection of WCT's can be achieved.

(8) When each WCT is provided with its own WCU, a costly and troublesome tap switch on WCT can be eliminated. This is because the function of the tap switch, which normally serves to balance the power on multitransformer installations, can be replaced with the control function of each WCU.

(9) In the embodiment of FIG. 6, the low voltage section (24, 25) is separated from the high voltage section (L1, H1, H2), by plastic board 250. This configuration prevents the low voltage signal wire (12), customarily terminated inside the WCU, from erroneous touching with the high voltage section.

(10) The weld setup information can be stored in two places, i.e., in the memory of MCI and in the memory of each WCU. When the contents of weld control is changed at MCI, since the memories of MCI and WCU store the same information, the weld control of each WCU can be automatically and accurately changed in accordance with the change at MCI.

(11) When the weld setup information is stored in the memories of MCI and WCU's, MCI and/or each WCU can perform verifications, from time to time, to insure that the information in the respective memories has not changed.

(12) All parts (WCT, power module 17, control module 18) are relatively small in size and light in weight, because they can be separated and enclosed in light, compact plastic housings.

(13) Full error checking of signals transmitted between MCI and WCU's can be performed by, for example, parity check method (cf. FIG. 18A-18C). This checking eliminates erroneous communication between MCI and WCU's and insures proper sequence operation, to thereby prevent bad or marginal weld quality. A conventional hardwire method is prone to select a wrong sequence if a wire breaks, often causing bad or marginal weld quality.

(14) No heavy lifting equipment is required to install the assembly of WCT/WCU, as is required with conventional ones.

(15) A cost advantage in saving of I/O wiring, plugs, etc., can be obtained, because WCU is directly connectable to WCT.

(16) When each WCT is provided with its own WCU, a junction box in a conventional installation of multiple transformers can be eliminated.

(17) Each WCT is provided with its own WCU, and WCT can be controlled by programs stored in WCU. The contents of the programs can be specifically determined for the power factor control of each WCT. Thus, better power factor control can be achieved to insure antisaturation of WCT at high power levels.

(18) When a constant current is used for welding, better current compensation can be achieved as there is just one transformer and gun to compensate for. Incidentally, how to obtain the constant current is disclosed in Japanese Patent Application No. 61-217921. (A U.S. Patent Application corresponding to this Japanese Application was filed by one of the applicants of this invention on Sep. 10, 1987.)

(19) When WCU is provided with a voltage detector (e.g., 332 in FIG. 17B), an accurate line voltage detection can be performed without influence of voltage drops between WCU and an AC power line. In other words, better line voltage sensing can be performed, as the sensed sample comes from the same connection as WCT, and all line voltage drops are observed at this point.

(20) Data gathered for a weld can apply to one weld only, rather than an average of many. This gives more accurate data for weld verification.

(21) Each WCU can check whether good welding has done (cf. FIG. 20). When good welding has not done, MCI sends a reweld command only to the WCU(s) of bad welding. Then, the reweld will not reheat a good weld in an attempt to repair a bad weld.

(22) Tighter current limits can be set for the diagnostics of WCT's, as there is one WCT per weld (cf. FIG. 21).

(23) A construction of mold plastic for WCT/WCU allows higher production rates than with conventional welded steel painted cabinets.

(24) There is improvement in a shunt trip circuit in that the circuit causes tripping of a breaker if a shunt trip loop opens (cf. FIG. 17A). (This is a "FAIL-SAFE CONDITION").

(25) There is also improvement in a shunt trip in that WCU does not always have to be functional to cause the shunt trip. The shunt trip is caused by two factors occurring at once:

(i) A certain voltage appears on the output of SCR's (cf. terminals H1 and H2 in FIG. 17A); and (ii) A shunt trip disabling condition is cancelled (the contact of relay CR2 in FIG. 17A is closed in this case).

(26) Since each of WCU's can be identified by its specific address number, even if many WCU's are connected to one MCI via a single serial transmission line, MCI can exactly manage each operation of WCU's.

What is claimed is:

1. A method for welding comprising:
coupling master control means to each of a plurality of welder units;
performing a weld using said plurality of said welder units;
gathering data of each welding condition of said welder units;
managing each welding of said welder units in accordance with the gathered welding condition data by means of a master control means;
providing each welder unit with a welding transformer module having welding electrodes and performing a weld at the welding electrodes using given welding power by means of said welding transformer module;
providing each welder unit with a control module detachably coupled to said welding transformer module and determining a welding condition of said welding transformer module by means of said control module;
providing each welder unit with a power module detachable coupled to said welding transformer module and said control module and supplying said given welding power from said power module via a switching device;
cooling said power module by means of a cooling structure integrated with the switching device;
constructing each of said welding transformer module, control module and power module to have a portable size and portable weight; and
enclosing each of said welding transformer module, control module, and power module in a plastic housing.

2. A method according to claim 1, comprising:
standardizing electrical mechanical connection interfaces between said welder means and said control means.

3. A method according to claim 1 comprising:
supplying a predetermined constant current to said welding transformer module and performing the weld using the predetermined constant current.

4. A welder apparatus comprising:
a plurality of welder units, each including,
a welding transformer module having welding electrodes and performing a weld at the welding electrodes using given welding power by means of said welding transformer module,
a control module detachably coupled to said welding transformer module and determining a welding condition of said welding transformer module, and
a power module detachably coupled to said welding transformer module and said control module and supplying said given welding power from said power module via a switching device;
means for gathering welding condition data for each welding condition of said welder units;
means for managing each welding of said welder units in accordance with the gathered welding condition data;
wherein each said welding transformer module, control module and power module are constructed to have a portable size and a portable weight; and
a housing for enclosing each of said welding transformer module, control module and power module.

5. An apparatus according to claim 4, further comprising:
a cooling structure, integrated with the switching device, for cooling said power module.

* * * * *